United States Patent
Taylor et al.

(10) Patent No.: US 12,269,413 B1
(45) Date of Patent: Apr. 8, 2025

(54) ACTIVE CONTROL OF ANTI-SUBMARINING AUTOMOTIVE PROTECTIVE DEVICES

(71) Applicant: Autoliv ASP, Inc., Ogden, UT (US)

(72) Inventors: Stephen Taylor, Auburn Hills, MI (US); Russ Gans, Auburn Hills, MI (US); Changsoo Choi, Auburn Hills, MI (US); Tim Whited, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/641,210

(22) Filed: Apr. 19, 2024

(51) Int. Cl.
| | | |
|---|---|---|
| *B60R 21/233* | (2006.01) | |
| *B60R 21/00* | (2006.01) | |
| *B60R 21/01* | (2006.01) | |
| *B60R 21/015* | (2006.01) | |
| *B60R 21/231* | (2011.01) | |
| *B60R 21/2338* | (2011.01) | |

(52) U.S. Cl.
CPC ............ *B60R 21/233* (2013.01); *B60R 21/01* (2013.01); *B60R 21/01512* (2014.10); *B60R 21/2338* (2013.01); *B60R 2021/0034* (2013.01); *B60R 2021/01238* (2013.01); *B60R 2021/01286* (2013.01); *B60R 2021/23107* (2013.01); *B60R 2021/23308* (2013.01); *B60R 2021/23324* (2013.01); *B60R 2021/23384* (2013.01)

(58) Field of Classification Search
CPC . B60R 21/01; B60R 21/015; B60R 21/01512; B60R 21/205; B60R 21/233; B60R 21/2338; B60R 2021/0034; B60R 2021/01238; B60R 2021/01286; B60R 2021/23169; B60R 2021/23176; B60R 2021/23308; B60R 2021/23324; B60R 2021/23382; B60R 2021/23384
See application file for complete search history.

(56) References Cited

U.S. PATENT DOCUMENTS

| | | | | |
|---|---|---|---|---|
| 7,568,729 | B2 * | 8/2009 | Schnieder | B60R 21/2338 280/739 |
| 7,607,689 | B2 * | 10/2009 | Kalczynski | B60R 21/2338 280/739 |
| 7,959,184 | B2 * | 6/2011 | Fukawatase | B60R 21/239 280/739 |
| 9,499,118 | B2 * | 11/2016 | Jindal | B60R 21/01512 |
| 9,580,039 | B2 * | 2/2017 | Schneider | B60R 21/233 |
| 9,650,011 | B1 * | 5/2017 | Belwafa | B60R 21/233 |
| 9,676,355 | B2 * | 6/2017 | Kruse | B60R 21/233 |
| 9,738,244 | B2 * | 8/2017 | Lee | B60R 21/2338 |
| 10,328,884 | B2 * | 6/2019 | Kobayashi | B60R 21/231 |
| 10,611,331 | B2 * | 4/2020 | Jang | B60R 21/2338 |
| 10,632,959 | B2 * | 4/2020 | Jeong | B60R 21/233 |

(Continued)

FOREIGN PATENT DOCUMENTS

JP       09118186 A  *  5/1997

*Primary Examiner* — Laura Freedman
(74) *Attorney, Agent, or Firm* — Foley & Lardner LLP

(57) ABSTRACT

An airbag assembly including an inflator to supply inflation gas and an airbag cushion configured to expand and deploy toward a seating position of a vehicle, the airbag cushion including a main chamber, a secondary chamber coupled to the main chamber, and a tether passing through the main chamber into the secondary chamber, wherein the tether is configured to be released to allow the secondary chamber to be inflated.

15 Claims, 9 Drawing Sheets

(56) References Cited

U.S. PATENT DOCUMENTS

| | | | |
|---|---|---|---|
| 10,730,472 B2 * | 8/2020 | Perez | B60R 21/233 |
| 10,773,679 B2 * | 9/2020 | Jeong | B60R 21/2338 |
| 10,787,146 B2 * | 9/2020 | Jang | B60R 21/237 |
| 10,836,337 B2 * | 11/2020 | Shin | B60R 21/233 |
| 10,988,103 B2 * | 4/2021 | Oh | B60R 21/239 |
| 11,046,282 B2 * | 6/2021 | Lee | B60R 21/233 |
| 11,117,540 B2 * | 9/2021 | Hwangbo | B60R 21/214 |
| 11,135,993 B2 * | 10/2021 | Rutelin | B60R 21/2342 |
| 11,345,305 B2 * | 5/2022 | Fischer | B60R 21/26 |
| 11,407,373 B2 * | 8/2022 | Kanegae | B60R 21/0134 |
| 11,498,513 B2 * | 11/2022 | Perez | B60R 21/205 |
| 11,752,970 B1 | 9/2023 | Lin et al. | |
| 11,807,166 B2 * | 11/2023 | Deng | B60R 21/2338 |
| 11,851,019 B2 * | 12/2023 | Sung | B60R 21/239 |
| 12,036,941 B1 * | 7/2024 | Lin | B60R 21/233 |

* cited by examiner

ACTIVE CONTROL OF ANTI-SUBMARINING AUTOMOTIVE PROTECTIVE DEVICES

TECHNICAL FIELD

The present disclosure relates generally to the field of automotive occupant protection, or protection for occupants of motor vehicles. More specifically, the present disclosure relates to airbag assemblies.

BACKGROUND

Inflatable airbags are examples of automotive protective devices that may be mounted within a vehicle and deploy during a collision event. The deployed airbag may cushion an occupant and prevent detrimental impact with other vehicular structures. Vehicle occupants in reclined positions may be protected less effectively than vehicle occupants in seated positions. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1A:
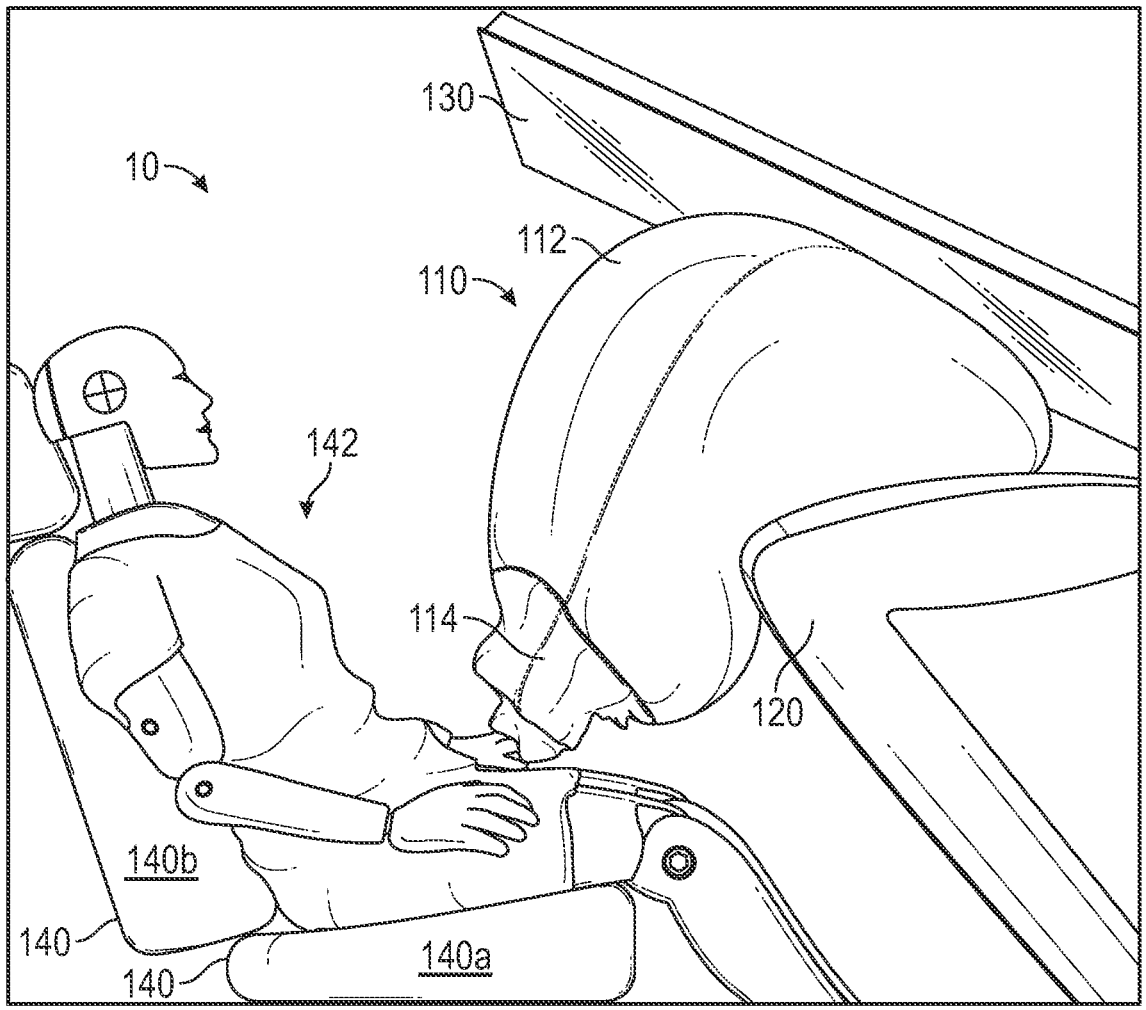
FIG. 1A is a side view of an example airbag assembly, according to one or more embodiments of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Automotive protective devices may be used to prevent or mitigate injury to an automotive vehicle occupant in the event of a crash. Automotive protective devices may include seatbelts, airbags, nets, cushions, and other devices. Automotive protective devices may mitigate injuries caused by rapid deceleration of the vehicle occupant in the event of a crash. Automotive protective devices may prevent collision of the vehicle occupant with vehicle structures such as a beam, a dashboard, or other structures.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or seats, adjacent to a roof rail of the vehicle, in an overhead position, or at the knee or leg position.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

An airbag assembly, or airbag system, can mitigate injury to an occupant of a vehicle during a collision event by reducing the effect of impact of the occupant against structures (body-structure impact) within the vehicle (such as, e.g., a dashboard, or door column).

Out-of-position occupants, in the event of a collision, may not interact in an optimal manner with deployed airbags. For example, reclined occupants may submarine beneath an airbag (i.e., slide underneath the airbag cushion) during a collision, reducing an effectiveness of the airbag. Embodiments discussed herein include an airbag assembly which adapts to a position of the occupant to protect out-of-position occupants, such as reclined occupants. For example, embodiments discussed herein may prevent or mitigate submarining of occupants during a collision. By adapting to the position of the occupant, the airbag assembly can more effectively protect the occupant during a collision.

FIG. 1A is a side view of an example airbag assembly, according to one or more embodiments of the present disclosure. The airbag assembly includes an airbag cushion 110. The airbag cushion 110 may receive inflation gas (e.g., from an inflator) to expand and deploy toward a seat 140 of a vehicle 10 during a collision. The seat 140 may include a seat base 140a and a seat back 140b. The seat 140 defines or otherwise provides a seating position 142 in the vehicle 10. The seating position 142 defines or otherwise provides a typical position for an occupant (e.g., driver, passenger) of the vehicle 10 to be seated or located, such as during operation of the vehicle 10. The airbag cushion 110 may deploy from a dashboard 120 of the vehicle 10 in a generally rearward direction toward the seat 140 and/or the seating position 142. The airbag cushion 110 may be inflated with inflation gas from an inflator, which may be located in the dashboard 120. The airbag cushion 110 may contact a windshield 130 of the vehicle 10 as the airbag cushion 110 deploys toward the seat 140.

The airbag cushion includes a main chamber 112 and a secondary chamber 114 coupled to the main chamber 112. The secondary chamber 114 expands and deploys using inflation gas from the main chamber 112. The secondary chamber 114 may be coupled to a lower portion of the main chamber 112. The main chamber 112 may include an upper portion and the lower portion. The upper portion of the main chamber 112 may deploy up from the dashboard 120 toward the windshield 130 and rearward towards the seat 140. The lower portion of the main chamber 112 may deploy downwards from a distal end of the upper portion of the main chamber 112 towards the seat 140 or towards the seat base 140*a*. The secondary chamber 114 may expand and deploy rearward towards the seat 140 or towards the seat back 140*b*. The secondary chamber 114 may be configured to contact a torso of an occupant of the seat 140.

The main chamber 112 may include a continuous internal chamber. In some implementations, a shape of the main chamber 112 is defined by a shape of panels of the main chamber 112 as well as interactions between the main chamber 112 and the dashboard 120 and/or the windshield 130. In some implementations, the main chamber 112 may include one or more internal tethers, panels, and/or sub-chambers to define the shape of the main chamber 112 when deployed. The secondary chamber 114 may include one or more internal tethers and/or panels to define the shape of the secondary chamber 114 when deployed.

As illustrated in FIG. 1A, the main chamber 112 can be fully deployed while the secondary chamber 114 may not be fully deployed. Inflation of the secondary chamber 114 may be restricted, and/or a volume of the secondary chamber 114 may be restricted (e.g., by a tether), when the main chamber 112 is fully deployed. Deployment of the secondary chamber 114 may be delayed relative to the deployment of the main chamber 112 such that the secondary chamber 114 is deployed after the main chamber 112 is deployed. During a collision event, the main chamber 112 deploys to protect an occupant of the vehicle and the secondary chamber 114 may or may not be deployed, depending on a position of the occupant, as discussed herein.

The secondary chamber 114 may be selectively deployed to protect an occupant of the seat 140. In an example, the secondary chamber 114 may be restricted from being deployed when the seat 140 positions or otherwise disposes the occupant in an upright position and may be deployed when the seat 140 positions or otherwise disposes the occupant in a reclined position. In an example, the secondary chamber 114 may be restricted from being deployed when the occupant is above a weight threshold (e.g., as detected by a sensor in the seat 140) and deployed when the occupant is below the weight threshold, or vice versa. In an example, the secondary chamber 114 may be restricted from being deployed when the occupant is above a height threshold and deployed when the occupant is below the height threshold, or vice versa.

Figure 1B:
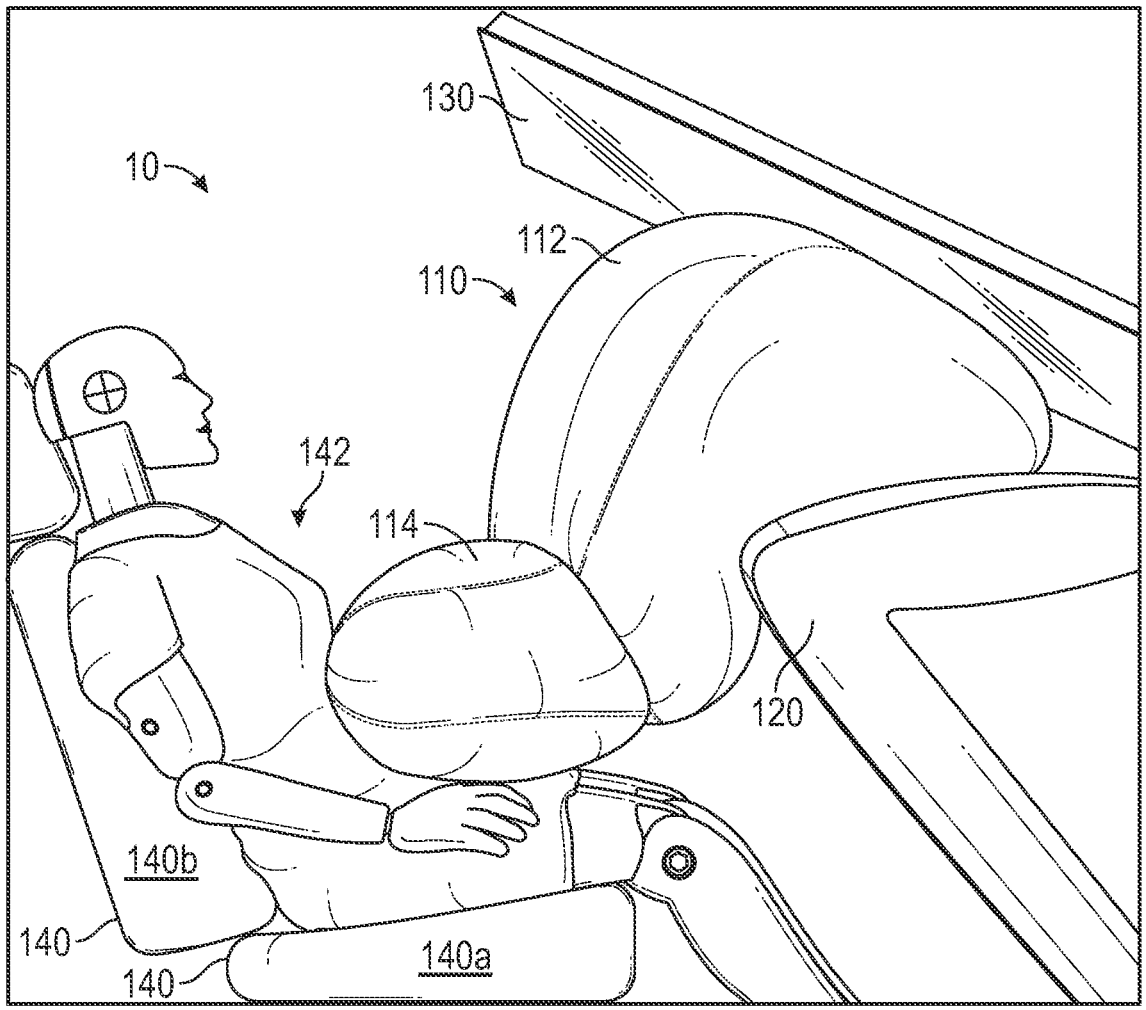
FIG. 1B is a side view of the airbag assembly of FIG. 1A, with the secondary chamber deployed, according to one or more embodiments of the present disclosure.

FIG. 1B is a side view of the airbag assembly of FIG. 1A, with the secondary chamber 114 deployed, according to one or more embodiments of the present disclosure. As discussed herein, the secondary chamber 114 may be selectively deployed to protect an occupant of the seat 140. In some implementations, the secondary chamber 114 may be deployed to prevent submarining of a reclined occupant. In an example, the secondary chamber 114 may be configured to deploy towards a torso of the occupant to contact the torso of the occupant and prevent the occupant from slipping beneath the main chamber 112. The secondary chamber 114 may be configured to contact the torso of the occupant to cause the occupant to bend over the secondary chamber 114 such that a head of the occupant contacts an upper surface of the secondary chamber 114. The upper surface of the secondary chamber 114 may be configured to receive the head of the occupant. In an example, the upper surface of the secondary chamber 114 includes a depression for the head of the occupant when deployed.

FIG. 1B is a perspective view of the airbag assembly of FIG. 1B, showing internal components of the airbag assembly, according to one or more embodiments of the present disclosure.

A tether 150 may extend through the main chamber 112 to the second chamber 114. The tether 150 may be coupled to an interior of the secondary chamber 114. In an example, the tether 150 is attached to an interior of a distal wall of the secondary chamber 114. The tether 150 may selectively restrict deployment of the secondary chamber 114 and allow deployment of the secondary chamber 114. The tether may hold the distal wall of the secondary chamber 114 near the main chamber 112 to restrict deployment of the secondary chamber 114. The tether 150, when not actuated, may restrict inflation of the secondary chamber 114 by reducing a volume of the secondary chamber 114. In this way, the tether 150 provides active control of deployment of the secondary chamber 144.

The tether 150 may be coupled to a control unit 122. The control unit 122 may be an engine control unit (ECU) and/or an airbag control unit (ACU). During a vehicle collision event, one or more sensors provide data to the control unit which determines if threshold conditions have been met for deployment of an automotive safety device such as the airbag cushion 110. The control unit 122 may cause an electrical pulse to be sent to an initiator of an automotive safety device. The control unit 122 may include the initiator or other mechanism for actuating (e.g., releasing) the tether 150. The control unit 122 may determine whether to fully release the tether 150 or partially release the tether 150. Fully releasing the tether may allow the secondary chamber 114 to fully deploy. Partially releasing the tether 150 may allow the secondary chamber 114 to partially deploy, or deploy a predetermined distance towards the occupant. The control unit 120 may determine a distance for the secondary chamber 114 to deploy towards the occupant based on the data from the one or more sensors.

The control unit 122 may determine whether to release the tether 150 based on one or more inputs. The control unit 122 may provide active control of the tether 150 and thus the deployment of the secondary chamber 114 based on the one or more inputs. The one or more inputs may include a position of the seat 140 and/or a presence of an occupant in the seat 140. In an example, the one or more inputs include a position (e.g., reclined position) of the seat back 140*b*. In an example, the one or more inputs include a position of the seat back 140*b* and a position (e.g., height, lateral displacement) of the seat base 140*a*. In some implementations, the one or more inputs indicate whether the occupant of the seat is reclined, and the control unit 122 releases the tether 150 to protect the reclined occupant. In an example, the position of the seat back 140*b* indicates that the occupant is reclined and the control unit 122 releases the tether 150 to deploy the secondary chamber 114 to prevent submarining of the reclined occupant.

The control unit 122 may receive the one or more inputs from one or more sensors. The one or more sensors may include seat position sensors, weight sensors, occupancy sensors, and other sensors to detect the presence and position of the occupant. In an example, the one or more sensors include a seat back motor sensor to determine the position of the seat back 140b. In an example, the one or more sensors include a weight sensor to determine whether an occupant is in the seat 140.

A panel 113 may be between the main chamber 112 and the secondary chamber 114. The panel 113 may separate the main chamber 112 and the secondary chamber 114. The panel 113 may be substantially vertical. The panel 113 may define a shape of the main chamber 112, the secondary chamber 114, and/or the interface between the main chamber 112 and the secondary chamber 114.

The tether 150 may include a fork, or split. The tether 150 may separate into multiple segments at the fork or split to attach to the secondary chamber 114. The multiple segments may allow the tether 150 to more effectively restrict deployment of the secondary chamber 114. In an example, two attachment points for the tether 150 may allow the tether to restrict deployment of the secondary chamber 114 more effectively than a single attachment point. The fork or split in the tether 150 may be before the panel 113 or after the panel. The tether 150 may pass through the panel 113 before or after the fork or split.

The panel 113 may include one or more vents 115. The one or more vents 115 may allow inflation gas from the main chamber 112 to inflate the secondary chamber 114. The tether 150 may pass through the one or more vents 115 to pass from the main chamber 112 to the secondary chamber 114. In an example, the one or more vents 115 include a single vent through which the tether 150 passes before separating into multiple segments. In an example, the one or more vents 115 include two vents through which the tether 150 passes after separating into multiple segments. In an example, the one or more vents 115 include a plurality of vents through which the tether 150 passes before separating into multiple segments. In some implementations, multiple segments of the tether 150 may pass through a single vent.

In some implementations, the distal wall of the secondary chamber 114 may at least partially cover the one or more vents 115 when the tether 150 restricts deployment of the secondary chamber 114. In an example, the tether 150 holds the distal wall of the secondary chamber 114 against the one or more vents 115 before the tether 150 is released. In this way, the tether 150, using the distal wall of the secondary chamber 114 to which it is attached, reduces airflow into the secondary chamber 114 and restricting deployment of the secondary chamber 114. The tether 150 may also reduce a volume of the secondary chamber 114 to restrict deployment of the secondary chamber 114 before the tether 150 is released.

Figure 2:
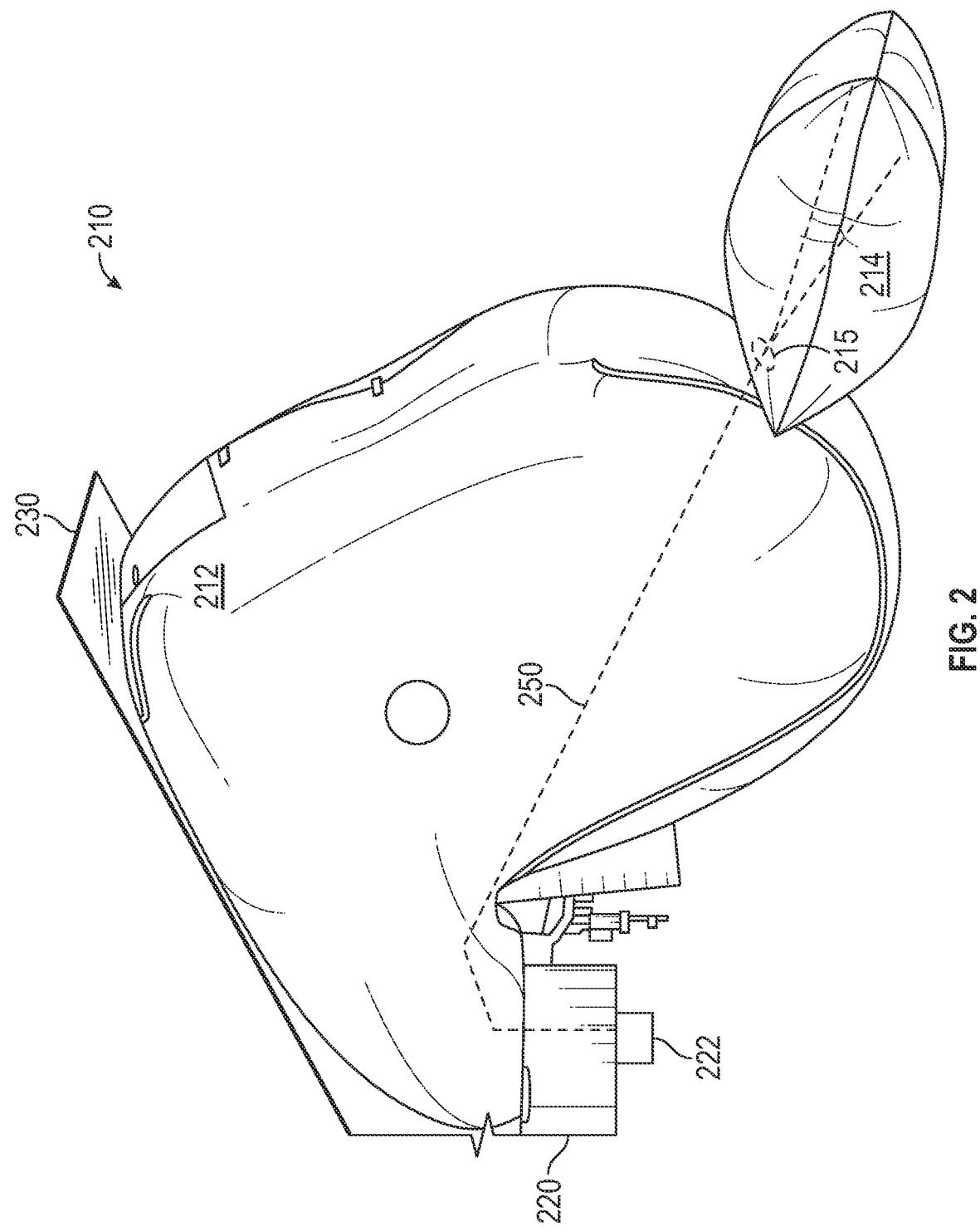
FIG. 2 is a perspective view of an example airbag assembly, according to one or more embodiments of the present disclosure.

FIG. 2 is a perspective view of an example airbag assembly 200, according to one or more embodiments of the present disclosure. The airbag assembly 200 includes an airbag cushion 210 and a tether 250. The airbag cushion 210 may deploy from a dashboard 220 of a vehicle. The airbag cushion 210 may be inflated with inflation gas from an inflator. The airbag cushion 210 includes a main chamber 212 and a secondary chamber 214 coupled to the main chamber such that inflation gas from the main chamber 212 can inflate the secondary chamber 214. In some implementations, the main chamber 212 contacts a windshield 230 of the vehicle. A vent 215 between the main chamber 212 and the secondary chamber 214 may allow inflation gas to pass from the main chamber 212 to the secondary chamber 214. The vent may define an interface between the main chamber 212 and the secondary chamber 214. In an example, the vent 215 may be formed by cutting a hole in a panel of the main chamber 212, cutting a corresponding hole in the secondary chamber 214, and attaching (e.g., sewing) the perimeters of the two holes together.

The tether 250 may selectively restrict deployment of the secondary chamber 214. The tether 250 may pass through the main chamber 212 and into the secondary chamber 214 via the vent 215. The tether 250 is attached to the secondary chamber 214. In an example, the tether 250 is attached to a distal interior wall of the secondary chamber 214. The tether 250 may, before being released, restrict deployment of the secondary chamber 214 by holding portions of the secondary chamber 214 adjacent the main chamber 212. In an example, prior to being released, the tether 250 has a length such that the tether 250 extends to a distal end of the main chamber 212, causing the tether 250 to hold the portion of the secondary chamber 214 adjacent the main chamber 212. In some implementations, the tether 250 at least partially covers the vent 215 with portions of the secondary chamber 214. In this way, the tether 250 restricts deployment of the secondary chamber 214 by reducing an airflow into the secondary chamber 214 and restricting a volume of the secondary chamber.

The tether 150 may be selectively released by a control unit 222 housed in the dashboard 220 of the vehicle. The control unit 222 may determine when (i.e., whether) the tether 250 is released. The control unit 222 may determine, based on input from one or more sensors, (e.g., seat sensors) whether the secondary chamber 214 will be deployed in the event of a collision and thus whether the tether 250 will be released. In an example, the control unit 222 determines, in response to a collision, that the secondary chamber 214 is to be deployed with the main chamber 212 and releases the tether 250. In an example, the control unit 222 continuously updates a deployment status of the secondary airbag 214 including whether and how much the secondary airbag 214 should deploy, and the control unit 222 executes the deployment status of the secondary airbag 214 in the event of a collision.

In some implementations, the secondary chamber 214 deploys once the main chamber 212 is fully deployed. In some implementations, the secondary chamber 214 deploys in parallel with, or at the same time as, the main chamber 212. In an example, the tether 250 is released as soon as the airbag 210 begins to deploy. In an example, the tether 250 is released when the control unit 222 measures a predetermined tension on the tether 250. In an example, the tether 250 is released after the airbag 210 begins to deploy according to a predetermined deployment delay.

Figure 1C:
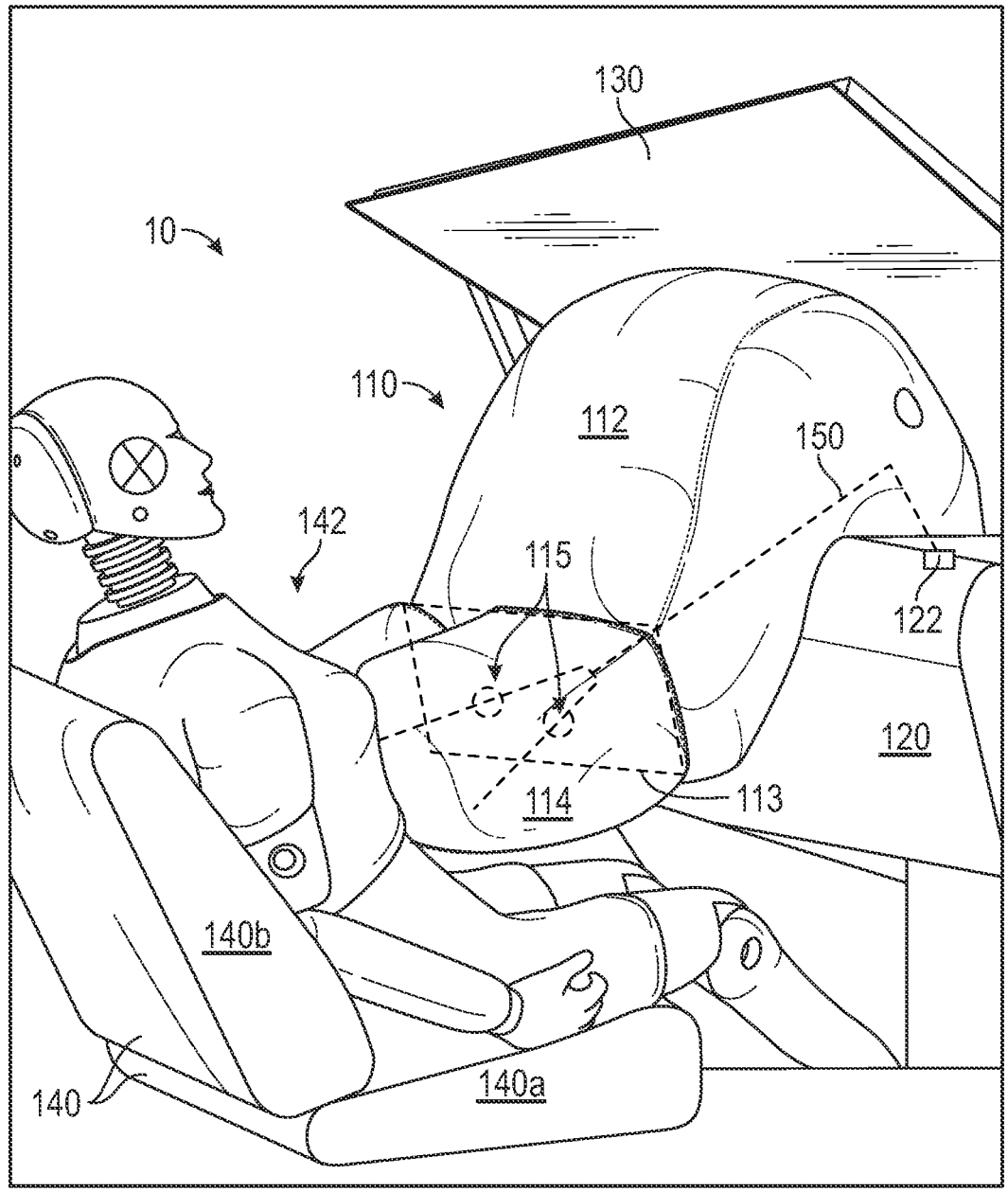
FIG. 1C is a perspective view of the airbag assembly of FIG. 1B, showing internal components of the airbag assembly, according to one or more embodiments of the present disclosure.
Figure 3:
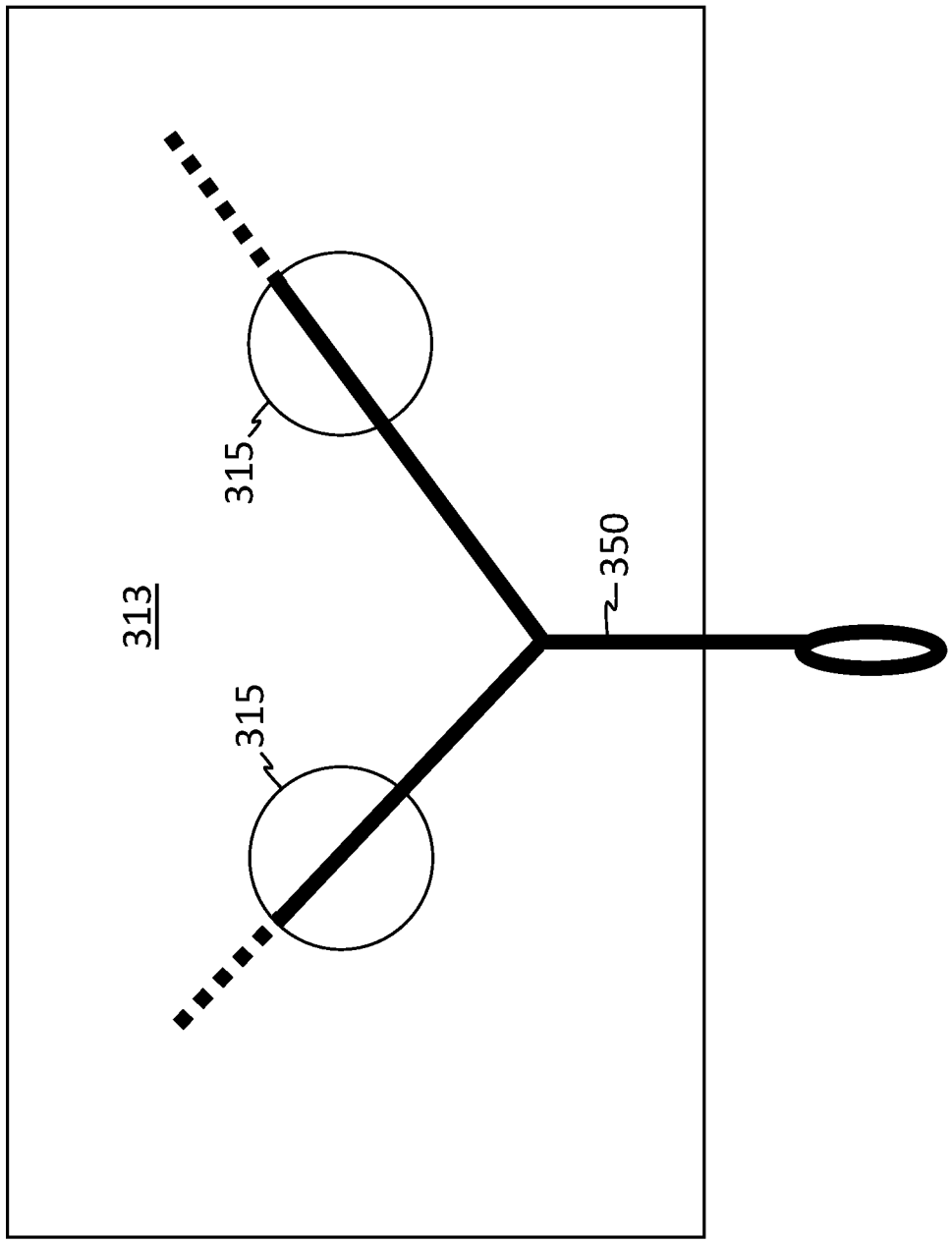
FIG. 3 illustrates an example panel and tether of an airbag assembly, according to one or more embodiments of the present disclosure.

FIG. 3 illustrates an example panel 313 and tether 350 of an airbag assembly, according to one or more embodiments of the present disclosure. The panel 313 and tether 350 may be similar to the panel 113 and tether 150 of FIG. 1C. The panel includes vents 315 through which the tether 350 passes. The tether 350 separates into two pieces before passing through the vents 315. In some implementations, the tether 350 separates into more than two pieces before passing through the vents 315. Although the vents 315 are illustrated as including two vents, the vents 315 may include any number of vents. In an example, the vents 315 include a single vent, and the tether 350 separates into two or more pieces after passing through the single vent.

Figure 4:
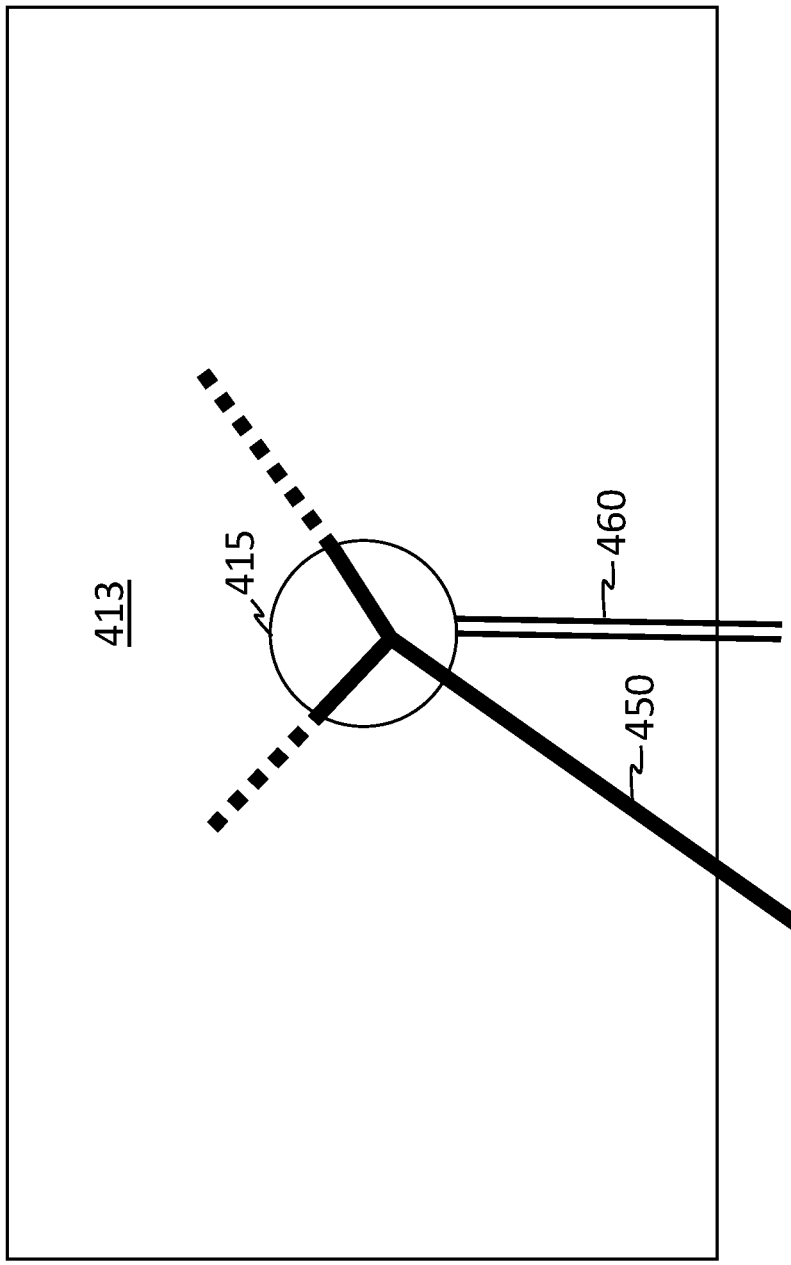
FIG. 4 illustrates an example panel and tether of an airbag assembly, according to one or more embodiments of the present disclosure.

FIG. 4 illustrates an example panel 413 and tether 450 of an airbag assembly, according to one or more embodiments of the present disclosure. The panel 413 may be a variation on, or take the place of the panel 113 of FIG. 1C. The panel 413 includes a vent 415. The tether 450 separates into two pieces after passing through the vent 415. In some implementations, the tether separates into two pieces before passing through the vent 415. The vent 415 includes a cinch cord 460. The cinch cord 460 may cause the vent 415 to at least partially close. In an example, the cinch cord 460 passes through material along a circumference of the vent 415 such that when the cinch cord 460 is pulled, the cinch cord 460 gathers the material together and reduces a circumference of the vent 415. The cinch cord 460 may be attached to a portion of an airbag cushion (e.g., the main chamber 112 of FIG. 1C) such that deployment of the airbag cushion pulls the cinch cord 460. In this way, the vent 415 may be closed according to a predetermined level of deployment of the airbag cushion. In an example, the cinch cord 460 is attached to the main chamber 112 of FIG. 1C such that the cinch cord 460 is pulled when the main chamber 112 reaches a predetermined level of deployment to restrict airflow between the main chamber 112 and the secondary chamber 114.

Figure 5:
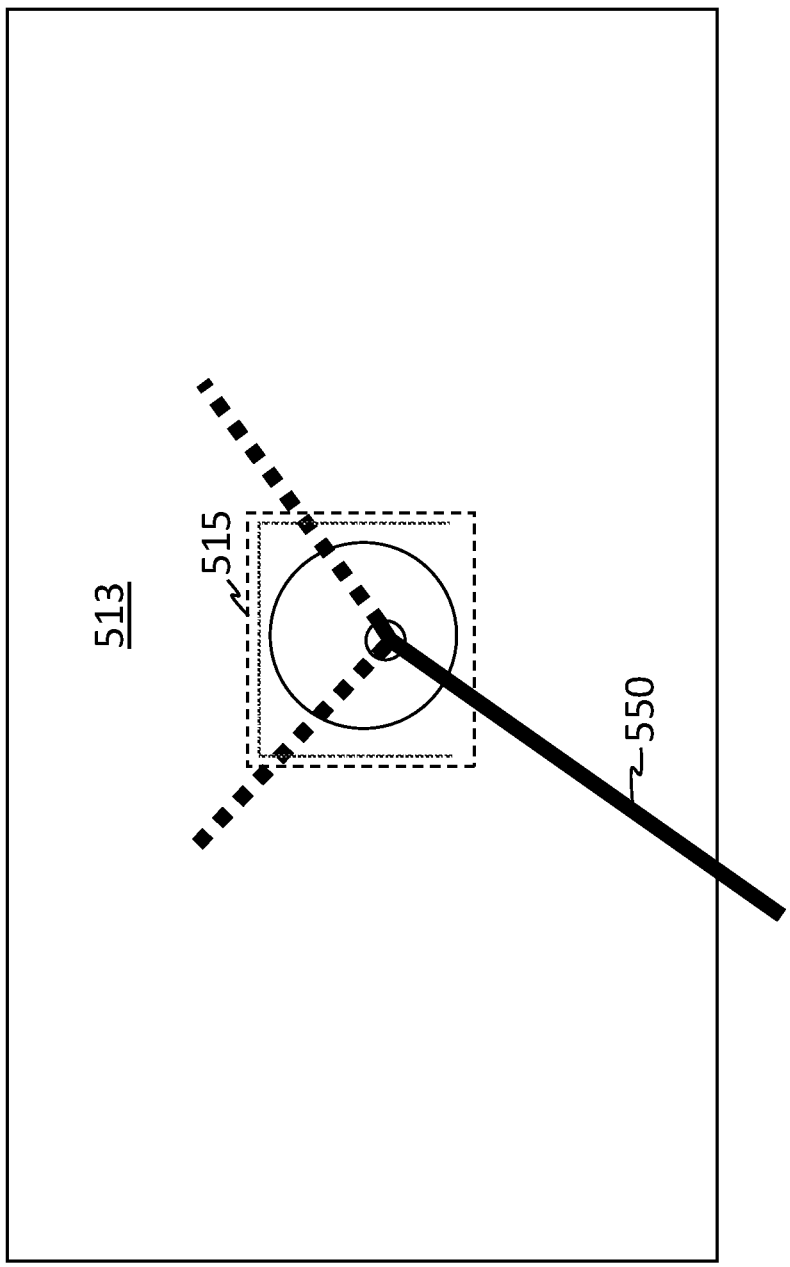
FIG. 5 illustrates an example panel and tether of an airbag assembly, according to one or more embodiments of the present disclosure.

FIG. 5 illustrates an example panel 513 and tether 550 of an airbag assembly, according to one or more embodiments of the present disclosure. The panel 513 may be a variation on, or take the place of the panel 113 of FIG. 1C. The panel 513 includes a one-way valve 515. The tether 550 separates into two pieces after passing through the one-way valve 515. In some implementations, the tether separates into two pieces before passing through the one-way valve 515. The one-way valve 515 may allow air to pass through the one-way valve 515 in only one direction. In an example, the one-way valve 515 allows air to pass through the panel 513 from the main chamber 112 to the secondary chamber 114 of FIG. 1C, but not back into the main chamber 112. In this way, the one-way valve 515 may cause the secondary chamber 114 to be fully inflated during a collision, increasing an effectiveness of the secondary chamber in preventing submarining of an occupant.

Figure 6:
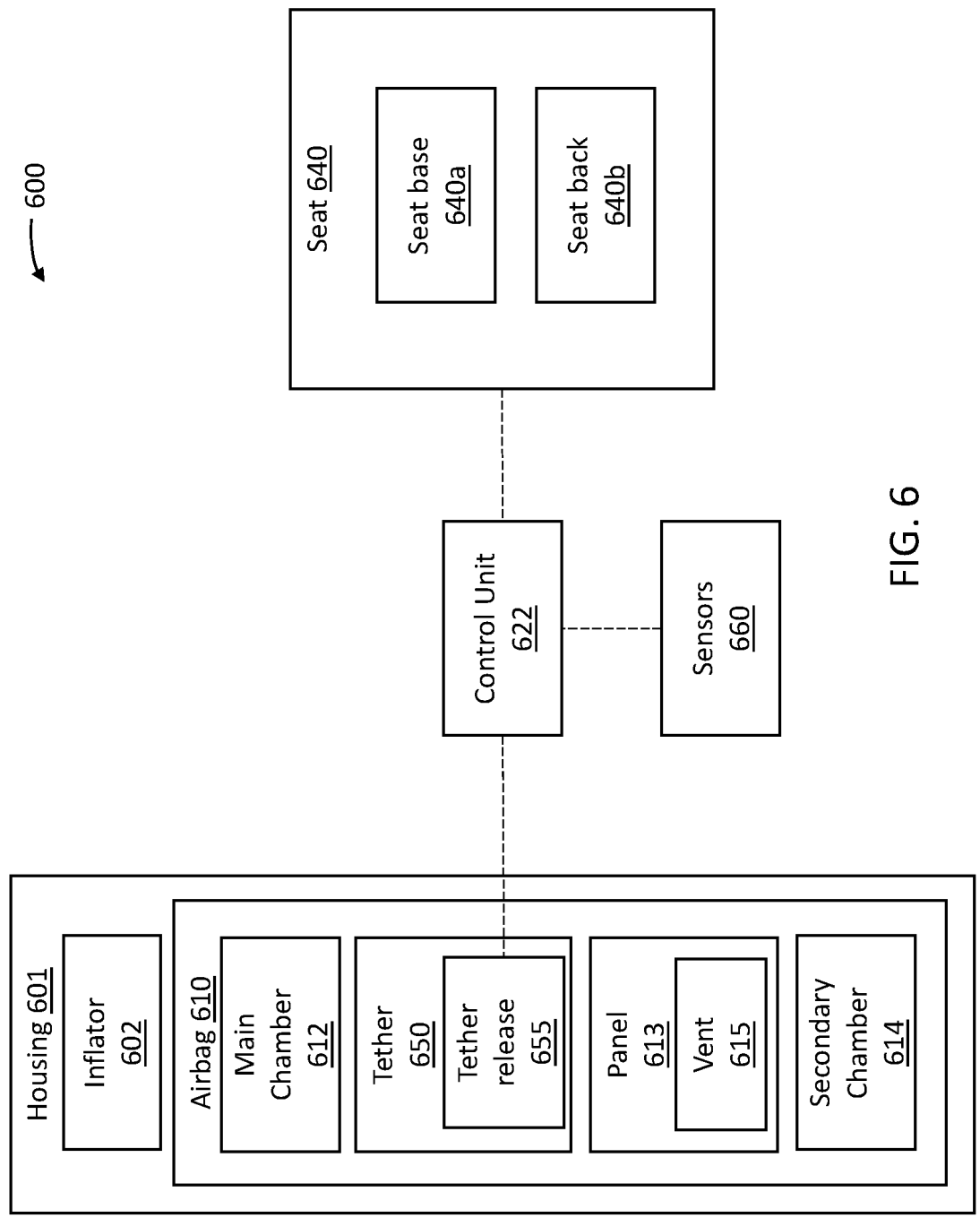
FIG. 6 is a block diagram of a system, according to one or more embodiments of the present disclosure.

FIG. 6 is a block diagram of a system 600, according to one or more embodiments of the present disclosure. The system includes a housing 601 containing an inflator 602 and an airbag cushion 610. The inflator 602 and the airbag cushion 610 may be enclosed within the housing 601. The inflator 602 may generate inflation gas which causes the airbag cushion 610 to inflate and deploy from the housing.

The airbag 610 includes a main chamber 612, a secondary chamber 614 coupled to the main chamber 612, a panel 613 between the main chamber 612 and the secondary chamber 614, a vent 615 in the panel to allow inflation gas to pass from the main chamber 612 to the secondary chamber 614, and a tether 650 passing through the main chamber 612 into the secondary chamber 614 via the vent 615. The tether 650 may restrict deployment of the secondary chamber 614 when not released, and allow the secondary chamber 614 to deploy when released. The main chamber 612 may deploy toward a seat 640, or seating position, during a collision, and the secondary chamber 614 may selectively deploy toward the seat 640 dependent upon the tether 650.

The tether 650 may include and/or be coupled to a tether release 655. The tether release 655 may be configured to be actuated to release the tether 650. The tether release 655 may include one or more mechanisms to release the tether 650. In some implementations, the tether release 655 includes a hook coupled to a loop in the tether 650, and when the tether release 655 is actuated, the hook releases the loop. In an example, the hook may be rotated such that the loop is released from the hook. In some implementations, the tether release 655 includes a blade configured to be actuated to cut the tether 650 in order to release the tether. In an example, the tether release 655 may move the blade to cut the tether. In some implementations, the tether release 655 includes a tether attachment site which moves to release the tether 650. In an example, the tether attachment site is a rod connected to a piston which actuates to move the rod out of a loop of the tether 650 to release the tether 650. In an example, the tether attachment site is an actuator which actuates to move out of a loop of the tether 650 to release the tether 650. Other examples of tether release mechanisms are considered, such as the tether release mechanism discussed in U.S. Pat. No. 11,912,221, which is incorporated herein by reference in its entirety.

A control unit 622 may actuate the tether release 655 to release the tether 650 to allow the secondary chamber 614 to deploy. The control unit 622 may provide active control of the tether 650 and thus the deployment of the secondary chamber 614. The control unit 622 may receive one or more inputs from the seat 640 as well as one or more other sensors 660. The seat 640 includes a seat base 640a and a seat back 640b. The one or more inputs may include a position and/or orientation of the seat base 640a and/or the seat back 640b. In an example, the position and/or orientation of the seat base 640a and/or the seat back 640b indicate whether an occupant of the seat 640 is reclined. The seat 640 may include one or more seat sensors. In an example, the one or more seat sensors include a seat back position sensor and/or a seat base position sensor. The seat back position sensor may measure an angle of the seat back 640b. The seat base position sensor may measure a displacement towards a rear or front of the vehicle of the seat base 640a. The control unit 622 may determine, based on input from the one or more seat sensors, a seating position defined by the seat 640. The control unit 622 may determine whether to actuate the tether release 655 based on the seating position. In some implementations, the control unit 622 actuates the tether release 655 based on the seating position corresponding to a reclined occupant. In some implementations, the control unit 622 predicts whether the occupant is in a reclined position based on the seating position.

The one or more other sensors 660 may include a weight sensor, an occupancy sensor, a height sensor, and other sensors. In an example, the one or more other sensors 660 may indicate to the control unit 622 whether an occupant is in the seat 640. In some implementations, one or more of the one or more other sensors is housed in the seat 640.

The control unit 622 selectively actuates the tether release 655 to protect the occupant during a collision. In an example, the control unit 622 determines that the occupant is in a reclined position and releases the tether to cause the secondary chamber 614 to deploy toward the seat 640. In this way, submarining of the occupant under the main chamber 612 may be prevented, as the secondary chamber 614 may contact a torso of the occupant, causing the occupant to bend forward such that an upper portion of the secondary chamber 614 receives a head of the occupant.

Figure 7:
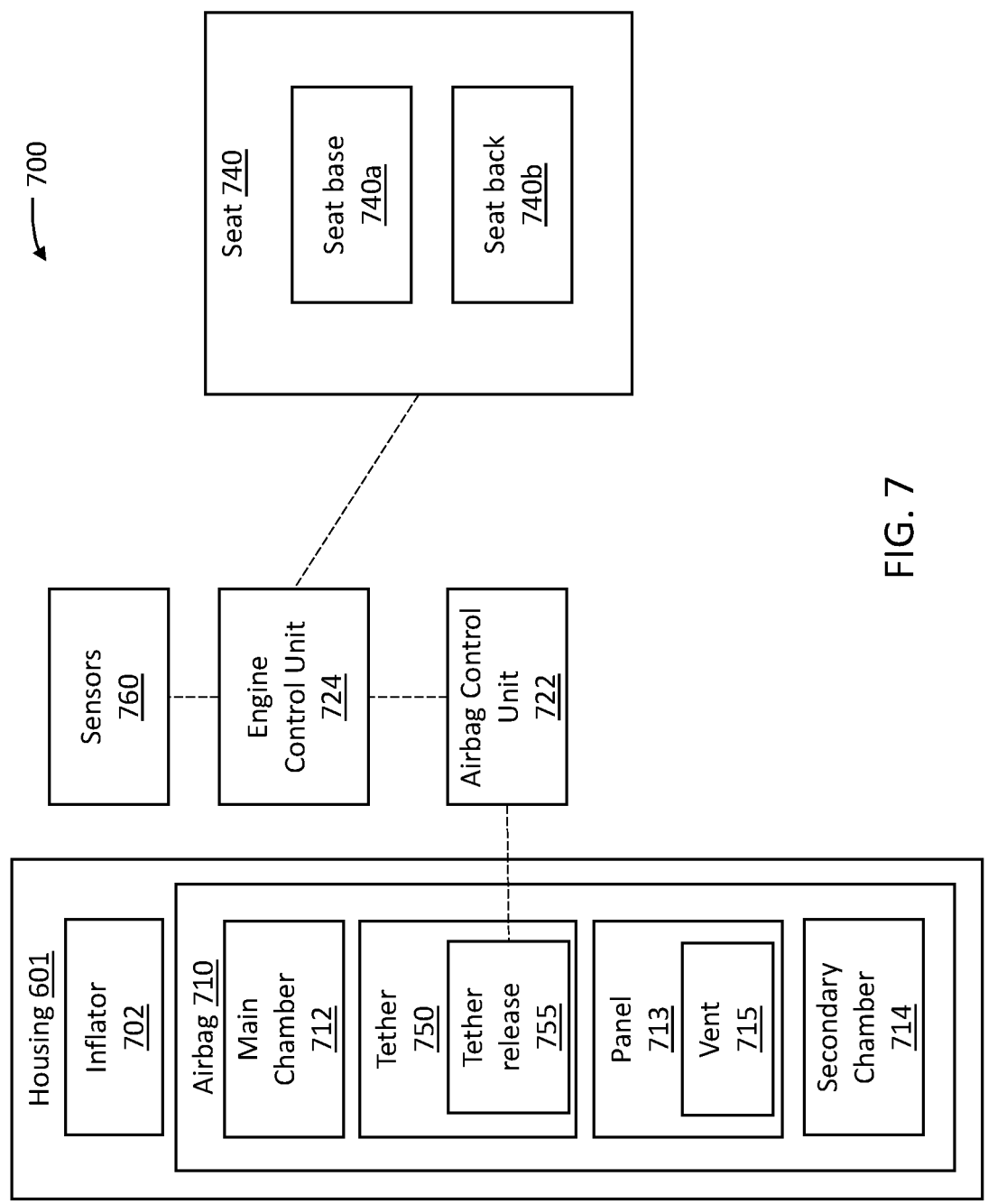
FIG. 7 is a block diagram of a system including an engine control unit and an airbag control unit, according to one or more embodiments of the present disclosure.

FIG. 7 is a block diagram of a system including an engine control unit 724 and an airbag control unit 722, according to one or more embodiments of the present disclosure. The system includes a housing 701 containing an inflator 702 and an airbag cushion 710. The inflator 702 and the airbag cushion 710 may be enclosed within the housing 701. The inflator 702 may generate inflation gas which causes the airbag cushion 710 to inflate and deploy from the housing.

The airbag 710 includes a main chamber 712, a secondary chamber 714 coupled to the main chamber 712, a panel 713 between the main chamber 712 and the secondary chamber 714, a vent 715 in the panel to allow inflation gas to pass from the main chamber 712 to the secondary chamber 714, and a tether 750 passing through the main chamber 712 into the secondary chamber 714 via the vent 715. The tether 750 may restrict deployment of the secondary chamber 714 when not released, and allow the secondary chamber 714 to deploy when released. The main chamber 712 may deploy toward a seat 740, or seating position, during a collision, and the secondary chamber 714 may selectively deploy toward the seat 740 dependent upon the tether 750.

The tether 750 may include and/or be coupled to a tether release 755. The tether release 755 may be configured to be actuated to release the tether 750. The tether release 755 may include one or more mechanisms to release the tether 750. In some implementations, the tether release 755 includes a hook coupled to a loop in the tether 750, and when the tether release 755 is actuated, the hook releases the loop. In an example, the hook may be rotated such that the loop is released from the hook. In some implementations, the tether release 755 includes a blade configured to be actuated to cut the tether 750 in order to release the tether. In an example, the tether release 755 may move the blade to cut the tether. In some implementations, the tether release 755 includes a tether attachment site which moves to release the tether 750. In an example, the tether attachment site is a rod connected to a piston which actuates to move the rod out of a loop of the tether 750 to release the tether 750. In an example, the tether attachment site is an actuator which actuates to move out of a loop of the tether 750 to release the tether 750. Other examples of tether release mechanisms are considered, such as the tether release mechanism discussed in U.S. Pat. No. 11,912,221.

The airbag control unit 722 may actuate (e.g., release) the tether release 755 to allow the secondary chamber 714 to deploy. The airbag control unit 722 may provide active control of the tether 750 and thus the deployment of the secondary chamber 714. The airbag control unit 722 may receive a signal from the engine control unit 724 to actuate the tether release 755. In some implementations, the airbag control unit 722 may receive a signal from the engine control unit 724 indicating whether to actuate the tether in the event of a collision.

The engine control unit 724 may receive one or more inputs from the seat 740 as well as one or more other sensors 760. The seat 740 includes a seat base 740a and a seat back 740b. The one or more inputs may include a position and/or orientation of the seat base 740a and/or the seat back 740b. In an example, the position and/or orientation of the seat base 740a and/or the seat back 740b indicate whether an occupant of the seat 740 is reclined. The one or more other sensors 760 may include a weight sensor, an occupancy sensor, a height sensor, and other sensors. In an example, the one or more other sensors 760 may indicate to the engine control unit 722 whether an occupant is in the seat 740. In some implementations, one or more of the one or more other sensors is housed in the seat 740.

The airbag control unit 722 selectively actuates the tether release 755 based on the signal from the engine control unit 724 to protect the occupant during a collision. In an example, the engine control unit 724 determines that the occupant is in a reclined position and causes the airbag control unit 722 to release the tether to cause the secondary chamber 714 to deploy toward the seat 740. In this way, submarining of the occupant under the main chamber 712 may be prevented, as the secondary chamber 714 may contact a torso of the occupant, causing the occupant to bend forward such that an upper portion of the secondary chamber 714 receives a head of the occupant.

Non-Limiting Examples

An airbag cushion, including a main chamber to receive inflation gas to expand and deploy toward a seating position of a vehicle, a secondary chamber to receive inflation gas to expand from the main chamber and deploy further toward the seating position of the vehicle, and a tether passing through the main chamber, through an opening in a panel of the main chamber and an opening of a panel of the secondary chamber, into the secondary chamber, wherein the tether is configured to be released to allow the secondary chamber to deploy and otherwise configured, when unreleased, to restrict deployment of the secondary chamber.

An airbag assembly, including an inflator to supply inflation gas and an airbag cushion configured to expand and deploy toward a seating position of a vehicle, the airbag cushion including a main chamber, a secondary chamber coupled to the main chamber, and a tether passing through the main chamber into the secondary chamber, wherein the tether is configured to be released to allow the secondary chamber to be inflated.

In some implementations, the tether is configured to be released by a control unit which releases the tether based on one or more inputs. In some implementations, the one or more inputs include a seat position and a presence of an occupant in the seating position. In some implementations, the one or more inputs indicate whether the occupant is reclined, wherein the control unit releases the tether based on the occupant being reclined. In some implementations, the tether includes two tether portions within the secondary chamber. In some implementations, the secondary chamber is separated from the main chamber by a panel. In some implementations, the panel includes a vent. In some implementations, the panel includes a one-way valve through which the tether passes through the panel, and wherein the one-way valve allows the gas to pass from the main chamber to the secondary chamber, and wherein the one-way valve prevents the gas from passing from the secondary chamber to the main chamber. In some implementations, the panel includes a cinch tube configured to restrict a passage of gas from the main chamber to the secondary chamber. In some implementations, prior to being released, the tether restricts inflation of the secondary chamber. In some implementations, the airbag assembly includes a housing to contain the inflator and airbag cushion. In some implementations, the control unit includes one of an airbag control unit and an engine control unit.

An anti-submarining airbag assembly, including an airbag cushion configured to expand and deploy toward an occupant of a vehicle, and an inflator configured to supply gas to the airbag cushion, wherein the airbag cushion includes a main chamber configured to expand and deploy toward the occupant and downwards, a secondary chamber coupled to the main chamber and configured to expand and deploy rearward toward the occupant to prevent submarining of the occupant, during a collision event, when the occupant is in a reclined position, and a tether passing through the main chamber into the secondary chamber, wherein the tether is configured to be released to allow the secondary chamber to be inflated.

In some implementations, the secondary chamber is coupled to a lower portion of the main chamber. In some implementations, the tether is configured to be released by a control unit which releases the tether, during the collision event, in response to the occupant being in the reclined position. In some implementations, the control unit determines that the occupant is in the reclined position based on a seat position and a presence of the occupant. In some implementations, the main chamber deploys from an instrument panel of the vehicle. In some implementations, an upper surface of the secondary chamber is configured to receive a head of the occupant. In some implementations, the secondary chamber is configured to contact a torso of the occupant during the collision event. In some implementations, the secondary chamber is separated from the main chamber by a panel. In some implementations, the panel includes one or more vents through which the tether passes from the main chamber into the secondary chamber. In some implementations, prior to being released, the tether restricts inflation of the secondary chamber.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

As used herein, inboard refers to a direction toward a centerline of a vehicle and outboard refers to a direction out of the vehicle and away from a centerline of the vehicle.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle seating position" refers to the position in which an occupant is generally positioned when seated in a seat of a vehicle. The term "occupant" refers to a person or crash test dummy within a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶ 16. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly, comprising:
an inflator to supply inflation gas; and
an airbag cushion configured to expand and deploy toward a seating position of a vehicle, the airbag cushion comprising:
a main chamber;
a secondary chamber coupled to the main chamber, wherein the secondary chamber is separated from the main chamber by a panel including two vents to allow the inflation gas to pass from the main chamber into the secondary chamber; and
a tether passing through the main chamber into the secondary chamber through the two vents, wherein the tether splits into two segments before the panel such that the two segments each pass through a respective vent of the two vents, and wherein the tether is configured to be released to allow the secondary chamber to be inflated.

2. The airbag assembly of claim 1, wherein the tether is configured to be released by a control unit which releases the tether based on one or more inputs.

3. The airbag assembly of claim 2, wherein the one or more inputs include a seat position and a presence of an occupant in the seating position.

4. The airbag assembly of claim 3, wherein the one or more inputs indicate whether the occupant is reclined, wherein the control unit releases the tether based on the occupant being reclined.

5. The airbag assembly of claim 2, wherein the control unit comprises one of an airbag control unit and an engine control unit.

6. The airbag assembly of claim 1, wherein the two vents each comprise a one-way valve through which the two segments of the tether pass through the panel, and wherein the one-way valve allows the gas to pass from the main chamber to the secondary chamber, and wherein the one-way valve prevents the gas from passing from the secondary chamber to the main chamber.

7. The airbag assembly of claim 1, wherein the two vents each comprise a cinch tube configured to restrict a passage of gas from the main chamber to the secondary chamber.

8. The airbag assembly of claim 1, wherein, prior to being released, the tether restricts inflation of the secondary chamber.

9. An anti-submarining airbag assembly, comprising:
an airbag cushion configured to expand and deploy toward an occupant of a vehicle; and
an inflator configured to supply inflation gas to the airbag cushion, wherein the airbag cushion includes:
   a main chamber configured to expand and deploy toward the occupant and downwards;
   a secondary chamber coupled to the main chamber and configured to expand and deploy rearward toward the occupant to prevent submarining of the occupant, during a collision event, when the occupant is in a reclined position, the secondary chamber separated from the main chamber by a panel including two vents to allow the inflation gas to pass from the main chamber into the secondary chamber; and
   a tether passing through the main chamber into the secondary chamber through the two vents, wherein the tether splits into two segments before the panel such that the two segments each pass through a respective vent of the two vents, and wherein the tether is configured to be released to allow the secondary chamber to be inflated.

10. The airbag assembly of claim 9, wherein the secondary chamber is coupled to a lower portion of the main chamber.

11. The airbag assembly of claim 9, wherein the tether is configured to be released by a control unit which releases the tether, during the collision event, in response to the occupant being in the reclined position.

12. The airbag assembly of claim 11, wherein the control unit determines that the occupant is in the reclined position based on a seat position and a presence of the occupant.

13. The airbag assembly of claim 9, wherein the main chamber deploys from an instrument panel of the vehicle.

14. The airbag assembly of claim 9, wherein an upper surface of the secondary chamber is configured to receive a head of the occupant.

15. The airbag assembly of claim 9, wherein the secondary chamber is configured to contact a torso of the occupant during the collision event.

* * * * *